United States Patent [19]

Sica, Jr.

[11] Patent Number: 5,120,133
[45] Date of Patent: Jun. 9, 1992

[54] INTERFEROMETER WITH TWO PHASE-CONJUGATE MIRRORS

[75] Inventor: Louis Sica, Jr., 5952 Berkshire Ct., Alexandria, Va. 22303

[73] Assignee: United States of America is represented by the Secretary of the Navy

[21] Appl. No.: 632,198

[22] Filed: Dec. 21, 1990

[51] Int. Cl.$^5$ ................................. G01B 9/02
[52] U.S. Cl. .................. 356/360; 356/345; 356/358
[58] Field of Search .............. 356/345, 347, 349, 350, 356/358, 361, 360

[56] References Cited

U.S. PATENT DOCUMENTS

| | | | |
|---|---|---|---|
| 4,280,764 | 7/1981 | Sica, Jr. et al. | 356/360 |
| 4,442,455 | 4/1984 | Huignard et al. | 356/347 |
| 4,575,245 | 3/1986 | Bordé | 356/350 |
| 4,739,496 | 4/1988 | Marom et al. | 356/347 |
| 4,979,828 | 12/1990 | Cronin-Golomb et al. | 356/361 |

OTHER PUBLICATIONS

J. P. Huignard et al., "Real-time double-exposure interferometry with Bi$_{12}$SiO$_{20}$ crystals in transverse electrooptic configuration", Appl. Opt. 1807–1809 (1977).
T. Sato et al., "Dynamic interferometric observation of differential movement", Appl. Opt. 3895–3897 (1983).
I. Bar-Joseph et al., "Low-power phase-conjugate interferometry", J. Opt. Soc. Am. 6, 414–416(1981).
J. Feinberg, "Interferometer with a self-pumped phase-conjugating mirror", Opt. Lett. 8, 569–571 (1983).
P. Yeh et al., "Doppler-free phase-conjugate reflection", Opt. Lett. 41–43 (1984).
J. Feinberg, "Continuous-wave self-pumped phase conjugator with wide field of view", Opt. Lett. 8, 480–482 (1983).

*Primary Examiner*—Samuel A. Turner
*Attorney, Agent, or Firm*—Thomas E. McDonnell; Edward F. Miles

[57] ABSTRACT

In an interferometer apparatus used for monitoring an object surface, the apparatus having a source of coherent light, a beam splitter for dividing the coherent light into a reference beam and an object beam, another beam splitter for dividing the object beam into two separate portions, and a light detector for detecting light interference, comprising an externally-pumped phase-conjugate mirror working in conjunction with a self-pumped phase-conjugate mirror. The externally-pumped phase-conjugate mirror receives the reference beam, receives one portion of the object beam, and reflects the received portion of the object beam to the detector as a first phase-conjugate beam. The self-pumped phase-conjugate mirror receives a second portion of the object beam and reflects the received portion of the object beam to the detector as a second phase-conjugate beam. The first and second phase-conjugate beams interfere at the detector, and the interference produced thereby is representative of changes in longitudinal distance between the object surface irrespective of roughness and the phase-conjugate mirrors.

8 Claims, 1 Drawing Sheet

INTERFEROMETER WITH TWO PHASE-CONJUGATE MIRRORS

BACKGROUND OF THE INVENTION

The present invention described herein relates to the field of optical monitoring of a rough surface. More specifically, the invention relates to optically monitoring the longitudinal position of a rough surface to interferometric precision.

Monitoring of rough surfaces to interferometric precision may be accomplished by known techniques employing holographic interferometry, and speckle photography. See R. K. Erf, editor, "Speckle Metrology", Academic Press, New York, 1978. These techniques produce a plurality of interference fringes across an image surface, and they require photographic film development or use of a TV camera and electronic subtraction to provide good fringe contrast. See J. N. Butters, R. Jones, and C. Wykes, "Electronic Speckle Pattern Interferometry", in "Speckle Metrology", by R. K. Erf, editor described above. It would be desirable, however, to be able to monitor a surface with interferometric precision without using film and the requisite steps for film development, or computer processing.

Other known techniques include the use of phase conjugating media instead of photographic film to implement holographic interferometry. See J. P. Huignard and J. P. Herriau, "Real-time double-exposure interferometry with $Bi_{12}SiO_{20}$ crystals in transverse electrooptic configuration", Appl. Opt., 1807–1809, 1977 and T. Sato, T. Hatsuzawa, and O. Ikeda, "Dynamic interferometric observation of differential movement", Appl. Opt., 3895–3897, 1983. Characteristically, with phase conjugating media, a plurality of interference contours cross the image of the surface being measured.

In Huignard et al. and Sato et al. mentioned above, an optical wavefront is transmitted through a transparent object and is recorded holographically in an initial exposure. Then, subsequent wavefront information is obtained from the object at a later time in the manner of double exposure holographic interferometry. The initial wavefront information is compared with the wavefront information obtained subsequently, and the comparison provides information about changes in the object over time. Phase conjugation is not used in these techniques of Huignard et al. and Sato et al. although the $Bi_{12}SiO_{20}$ (BSO) crystal used to record the exposures has also been used in phase conjugation. Although not actually disclosed in the articles of Huignard et al. and Sato et al, their techniques could, in principle, be used to examine opaque surfaces in reflection. But even so, a plurality of fringes would extend across the field, and the spacing and positioning of the plurality of fringes would change as the object position and orientation would change. It would be desirable, however, to be able to make surface measurements with interferometric precision without employing double exposures separated in time.

The prior art also discloses U.S. Pat. No. 4,280,764 by L. Sica and H. Szu for a "Phase-Conjugate Interferometer." In this patent, it is disclosed that the phase conjugate to a given wavefront could serve as a reference for that wavefront in an interferometric measurement of its phase. The basic apparatus arrangement includes a Michelson interferometer with one of the mirrors replaced by a phase-conjugating mirror. The phase conjugator acting on an optical signal, represented by $A\exp(i\theta)$, produces the complex conjugate of the spatial portion of the signal, represented by $A\exp(-i\theta)$, where A is the nonnegative real amplitude of the light wave, and $\theta$ specifies its phase. In particular, $\theta = [2\pi f(x,y)\lambda]$, where $\lambda$ is the signal's wavelength, and $f(x,y)$ specifies the optical path variations perpendicular to the direction of the signal propagation, the z direction. Thus $\theta$ is a distance in the z direction expressed in radians. The sum of the two wavefronts as produced with an interferometer is $2A\cos\theta$, and the corresponding observed intensity at the output is $4A^2\cos^2\theta$. Thus, by a computation, the measurement of intensity allows the calculation of the phase of the input light wave. This technique provides an image of an interference pattern. It would be desirable, however, to conduct measurements with interferometric precision that do not require the use of an interference pattern image.

In additional prior art, I. Bar-Joseph, A. Hardy, Y. Katzir, and Y. Silberberg, "Low-power phase-conjugate interferometry", Opt. Lett., vol. 6, page 414, 1981, the phase-conjugate wave is produced with a phase conjugator, using two pump beams. In J. Feinberg, "Interferometer with a self-pumped phase-conjugating mirror," Opt. Lett., vol. 8, 569–571, 1983, the phase-conjugate wave is produced in the photorefractive crystal $BaTiO_3$ which allows the process of self-pumping, i.e. where no external reference beams are required for the phase-conjugation process.

Both externally pumped (externally referenced) and self-pumped (self-referenced) phase-conjugate waves provide the desired light wave interference for interferometry. However, there is a difference between them. In the process of self-pumping described in the above-mentioned article by Feinberg, sensitivity to spatially uniform phase shifts of the input wave to the phase conjugator is lost. (By uniform, it is meant entirely longitudinal, i.e. along the z direction. This kind of phase shift is not conjugated by a self pumped phase conjugate mirror. Contrast this with a transverse phase variation, i.e. one which occurs at least in part in a spatial direction transverse to z. Such a phase shift in general affects the form and spacing of interference fringes in an interferometer. Reflection from a rough surface produces such disturbances. This means that a spatially constant phase shift due to, for example, placing a glass plate in the self phase conjugator arm of the interferometer is not compensated, resulting in a shift in the output fringe system just as in the case for a normal non-phase-conjugating mirror. The occurrence of this phase shift at the interferometer output does not take place for a phase conjugator that uses external reference beams as is also demonstrated in the same Feinberg article. In case of external reference beams, a longitudinal phase shift introduced into the conjugating arm of the interferometer is compensated, and there is no shift of the output fringes. It would be desirable, therefore, to provide a technique for measuring surfaces with interferometric precision which combines properties of both self-referenced and externally referenced phase conjugators. It is desirable to do this when surface location or displacement is important irrespective of lack of optical flatness.

In other prior art, P. Yeh, M. D. Ewbank, M. Khoshnevisan, and J. M. Tracy in "Doppler-free phase-conjugate reflection", Opt. Lett., vol. 9, 41–43, 1984 disclose that the reflection from a moving phase-conjugate mirror does not exhibit a Doppler shift in frequency using four-wave mixing, including externally pumped reference waves, with photorefractive $Bi_{12}SiO_{20}$ (BSO) in a phase-conjugate Michelson interferometer. This reference discloses a beam splitter and two mirrors, one of which is a conventional mirror and the other of which is a phase-conjugate mirror. Both the mirrors are stationary in a frame of reference. Reflected beams from both the stationary mirror and the phase-conjugate mirror recombine and interfere at a detector, and an angular beat frequency of $2\delta$ is observed due to motion of an external mirror. A piezoelectric transducer is used to modulate the position of the plane mirror and thereby the frequency of light reflected from it, which light is input into the phase conjugate mirror. As a result, the interferometer exhibited variation in the output intensity as a function of the piezoelectric transducer motion. It would be desirable, however, to provide a technique for measuring the positional changes of rough surfaces, as well as the optically finished surfaces used in the above reference, with interferometric precision.

SUMMARY OF THE INVENTION

Accordingly, it is an object of the present invention to provide an interferometer that combines properties of both self-referenced and externally referenced phase conjugators.

Another object of the invention is to monitor a surface with interferometric precision without using film and the requisite steps for film development.

Still another object is to make surface measurements with interferometric precision without employing double exposures separated in time.

Yet another object of the invention is to conduct measurements with interferometric precision that do not require the use of an interference pattern image.

Another object is to provide a technique for measuring position of rough surfaces with interferometric precision.

Briefly, these and other objects are accomplished by a novel interferometric apparatus which employs two interfering phase-conjugate beams from two different phase-conjugators to produce an interference pattern that is detected by an optical detector. More specifically, a laser beam is split to provide an object beam and a reference beam. Both the object beam and the reference beam interact in a nonlinear medium to produce an externally-pumped phase-conjugate mirror which transforms the object beam into a first phase-conjugate beam which is sent to a detector. The reference beam is split into two pump beams for pumping the externally pumped phase conjugate mirror. A portion of the object beam is directed to a self-pumped phase-conjugate mirror from which a second phase-conjugate beam is directed to the detector. The first and second phase-conjugate beams interfere with one another at the detector, and the signals produced at the detector are indicative of changes in distance between an object and the two phase-conjugators.

Generally speaking, both the externally-pumped phase-conjugate mirror and the self-pumped phase-conjugate mirror will phase conjugate non-longitudinal phase shifts, e.g. those caused by the roughness of the object, in the wavefronts coming off of a stationary rough surface. However, only the externally-pumped phase-conjugate mirror is sensitive to a longitudinal phase change, and only the externally-pumped phase-conjugate mirror will phase conjugate the longitudinal phase change which is in the direction of wavefront propagation resulting from movement of the rough surface. The self-pumped phase-conjugate mirror is insensitive to a longitudinal component of phase change and will not phase conjugate a purely longitudinal component of phase change. Instead, the self-pumped phase-conjugate mirror merely act as a conventional mirror with respect to the purely longitudinal component of phase change. The differences between the externally-pumped phase-conjugate mirror and the self-pumped phase-conjugate mirror in their response to a purely longitudinal phase change resulting from an irregular surface or object are exploited in the present invention.

With the present invention, details of the variations of phase in directions transverse to the field propagation direction resulting from the object's surface roughness are substantially the same (except perhaps for relatively small differences in reflectivity) after reflection from both the externally-pumped phase-conjugate mirror and the self-pumped phase-conjugate mirror. However, only the externally-pumped phase-conjugate mirror retains information as to the longitudinal phase components. Thus, by permitting the beams coming off of the respective externally-pumped phase-conjugate mirror and the self-pumped phase-conjugate mirror to interfere, only the longitudinal phase change contributes to the interference that takes place. This longitudinal phase change corresponds to a linear change in position of the object along the z direction. Moreover, complex transverse phase changes brought about by a complex rough surface on the object do not affect the interference due to the longitudinal phase changes. The interference due to the longitudinal phase changes are picked up by a detector which picks up oscillations in the intensity of the light that result from destructive and constructive interference of the wavefronts from the externally-pumped phase-conjugate mirror and the self-pumped phase-conjugate mirror. When the surface of the object is stationary, no longitudinal change takes place; and there is essentially no change in interference picked up by the detector.

In accordance with another aspect of the invention, a method is provided for monitoring the longitudinal position of an object surface. In the method, a first portion of a coherent light beam is directed onto a nonlinear medium to form an externally-pumped phase-conjugate mirror, the first portion serving as a reference beam. A second portion of the coherent light beam is directed onto the object surface, such that an object beam reflects off of the object surface. A first portion of the object beam is directed to the externally-pumped phase-conjugate mirror, such that the first portion of the object beam reflects off of the externally-pumped phase-conjugate mirror and passes to a detector. A second portion of the object beam is directed to a self-pumped phase-conjugate mirror, such that the second portion of the object beam reflects off the self-pumped phase-conjugate mirror and is also directed to the detector. At the detector, the first and second reflected portions of the object beam are permitted to interfere with one another, such that the detector produces an output signal representative of the interference. The interference is indicative of changes in longitudinal position between the object surface and the phase-conjugate mirrors.

Other objects, advantages and novel features of the invention will become apparent from the following detailed description of the invention when considered in conjunction with the accompanying drawings herein.

DESCRIPTION OF THE PREFERRED EMBODIMENT

Figure 1:
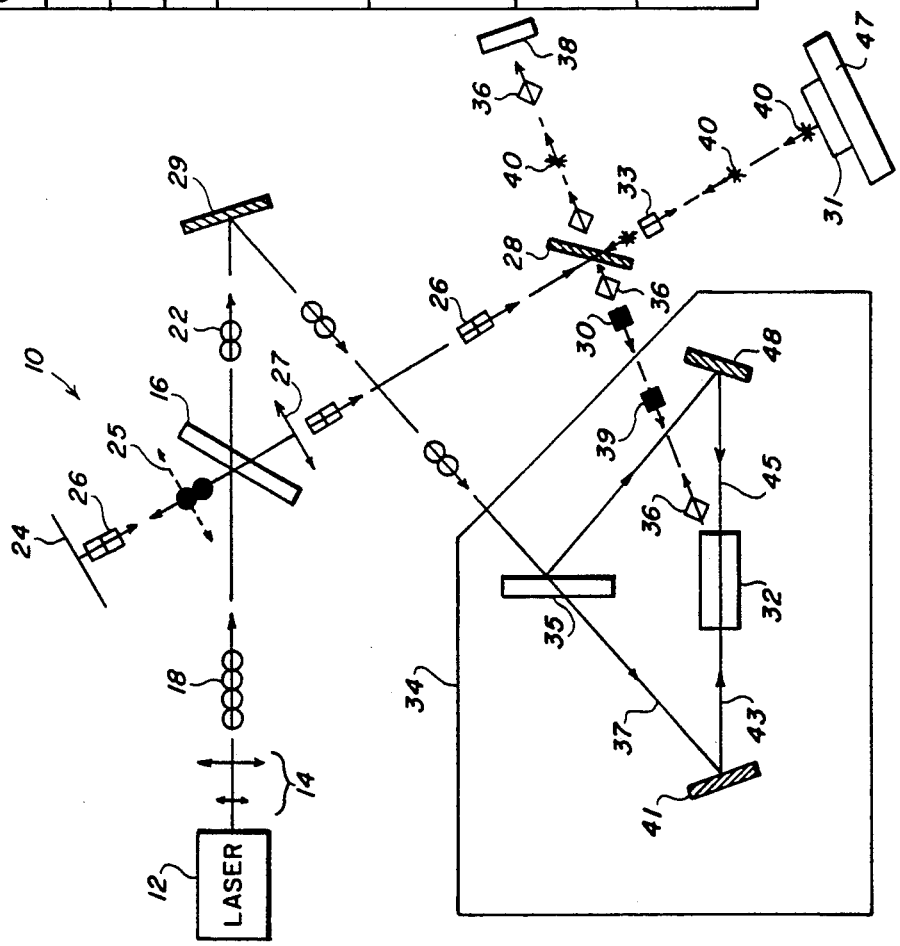
FIG. 1 shows schematically an embodiment of the invention.

With reference to FIG. 1, an interferometer with two phase-conjugate mirrors of an apparatus 10 is shown. More specifically, a coherent beam from a continuous wave argon laser 12 lasing at 5145 Angstroms is directed through a beam expander 14 and to first beam splitter 16. Laser 12 can be any source of coherent light that is otherwise compatible with system hardware, and especially the response of the nonlinear media to produce the phase conjugate mirrors. The expanded laser beam 18 is depicted as an arrow having four empty circles at the tail. See the "Legend" on FIG. 1.

The expanded laser beam 18 impinges upon the front side of the first beam splitter 1 which divides the laser beam 18 into a reflected object probe beam 20 (depicted as an arrow having two filled circles at the tail) and a reference beam 22 (depicted as an arrow having two empty circles at the tail) that passes out the rear side of the beam splitter 16. Preferably, disposed between laser 12 and beam splitter 16 is a an isolator (not shown) to protect laser 12 from backreflections. The isolator can be, for example, a conventional Faraday rotator polarizer assembly.

The object probe beam 20 passes through a first lens 25 (optional), is reflected off of the object 24 whose surface or longitudinal position is to be monitored and becomes an object beam 26 (depicted as an arrow having two empty rectangles at the tail). With the invention, the longitudinal position of the surface of the object is the distance of the surface of the object with respect to a phase-conjugate mirror employed in the invention. The first lens 25 can be used to focus the object probe beam 20 down to a small spot on the surface of the object 24. If the surface of the object 24 were changing its contour differentially, longitudinal changes in a local region could be monitored.

The reference beam 22 is reelected off of conventional first mirror 29 toward an externally-pumped phase-conjugate mirror assembly 34. In fact, the reference beam 22 is split inside the assembly 34 by third beam splitter 35 into two substantially equivalent beams 37 and 39. Beam 37 is reflected off of second conventional mirror 41, and the reflected beam 43 is directed into one side of a $Bi_{12}SiO_{20}$ (BSO) crystal 32. BSO is a nonlinear crystal. The BSO crystal 32 can be a 1 cm × 1 cm × 1 cm cube that may be obtained from Crystal Technology, Inc. The source, material, and parameters of crystal 32 are exemplary only. Beam 39 is reflected off of third conventional mirror 48, and the reflected beam 45 is directed into an opposite side of the BSO crystal 32 than the reflected beam 43. Beams 43 and 45, which are derived from the reference beam 22, serve as the external beams which pump the externally-pumped BSO crystal 32. Further details of the external pumping of BSO crystal 32 are described in the above-mentioned article by P. Yeh, M. D. Ewbank, M. Khoshnevisan, and J. M. Tracy in "Doppler-free phase-conjugate reflection", Opt. Lett., vol. 9, 41–43, 1984.

The object beam 26 passes out the backside of the first beam splitter 16 through second lens 27, where a diffuse object beam 26 is collected and is directed to a second beam splitter 28. Varying amounts of surface area of the object 24 can be used for the measurement by adjusting lens 25, object-image distances, and the focal length of second lens 27 and its position with respect to the second beam splitter 28. For proper operation, the cross-section area of object beam 26 that has passed through lens 27 should be no larger than the cross-sectional area of the respective reflected reference beams 43 and 45 when they enter BSO crystal 32. It is noted, however, that a precisely focussed image is not necessary for the apparatus of the invention to function properly.

The front side of the second beam splitter 28 reflects a first portion of the object beam 26 to become a first reflected object beam 30 (depicted as an arrow having a filled rectangle at the tail). In addition, second beam splitter 28 passes a second portion 33 of the object beam 26 out of its backside to become the portion 33 of the object beam 26 that goes to a self-pumped phase-conjugate mirror 31. The portion 33 of the object beam 26 that goes to the self-pumped phase-conjugate mirror 31 is depicted as an arrow having an empty rectangle at the tail.

The first reflected object beam 30 is reflected to a photorefractive BSO crystal 32 of externally-pumped phase-conjugate mirror assembly 34 where the beam is reflected off of the photorefractive BSO crystal 32 to become a second reflected object beam 36 (depicted as an arrow having an empty diamond at the tail). The second reflected object beam 36 is a phase-conjugate beam of the first reflected object beam 30 that impinges on the BSO crystal 32. The second reflected object beam 36 (the phase-conjugate beam from the externally-pumped phase-conjugate mirror 32) passes through the second beam splitter 28, emerging from the backside of second beam splitter 28, and impinges on detector 38.

As stated above, a second portion 33 of the object beam 26 passes through the second beam splitter 28 and goes to the self-pumped phase-conjugate mirror 31. At the self-pumped phase-conjugate mirror 31, the beam portion 33 is reflected to become a third reflected object beam 40 depicted is FIG. 1 as an arrow having an asterisk at the tail. The third reflected object beam 40 is a phase-conjugate beam of the portion 33 of the object beam 26. The third reflected object beam 40 (the phase-conjugate beam from the self-pumped phase-conjugate mirror 31) reflects off of the backside of the second beam splitter 28 and is directed to the detector 38.

At the detector 38, the two phase-conjugate beams interfere; that is, the phase-conjugate beam from the externally-pumped phase-conjugate mirror 32 and the phase-conjugate beam from the self-pumped phase-conjugate mirror 31 interfere to produce an electrical signal representative of the interference. The provision of an electrical signal representative of the interference of the two phase conjugate beams for a rough surface is in contrast with conventional interference images.

A detailed description of the operation of the self-pumped phase-conjugate mirror 31 of the invention is described in the article by J. Feinberg, "Interferometer with a self-pumped phase-conjugating mirror," Opt. Lett., vol. 8, 569–571, 1983. Briefly, the phase-conjugate wave is produced in the photorefractive, single-domain crystal of $BaTiO_3$ which allows the process of self-pumping, i.e. where no external reference beams are required for the phase-conjugation process. The $BaTiO_3$ crystal measured 4.6 mm × 4.8 × 4.2 mm, with the "c" axis parallel to the 4.6 mm edge. The composition and size of crystal 31 is merely exemplary. The second portion 33 of the object beam 26 serves as an incident beam into the BaTiO$_3$ crystal, and the incident beam serves to self-pump the phase conjugator by internal nonlinear interaction, scattering and reflection at the crystal faces.

The following theoretical explanation of apparatus 10's operation is provided to lend greater understanding of the operation of apparatus 10. The operation of the invention is not limited to the theoretical explanation provided herein.

With the embodiment of the apparatus 10 depicted in FIG. 1, the two phase-conjugators 31 and 32 each return the same optical field U* to the second beam splitter 28 as far as transverse phase components are concerned. The field U* is the phase-conjugate of the incident field U. However, if the incident field is Uexp(i$\theta$) where $\theta$ is a distance in radians along the direction of field propagation measured at the second beam splitter 28, then the self-pumped phase-conjugate mirror 31 returns the field U*exp($\theta + \theta_s$) where $\theta_s$ is the phase resulting from propagation to the self-pumped phase-conjugate mirror 31 and back to the second beam splitter 28 (just as for a conventional mirror), whereas the externally-pumped phase-conjugate mirror 32 returns the field U*exp($-i\theta$) as described in the above-mentioned J. Feinberg, "Interferometer with a self-pumped phase-conjugating mirror," Opt. Lett., vol. 8, 569–571, 1983.

Consequently the sum A of the two phase-conjugate fields at the second beam splitter 28 is:

$$A = U^* expi(\theta + \theta_s) + U^* exp(-i\theta) \qquad \text{(Eq. 1)}$$

The intensity of the light is: I = A*A $$I = |U|^2 2[1 + cos(2\theta + \theta_s)] \qquad \text{(Eq. 2)}$$

where $\theta$ depends on the longitudinal spatial position of the object 24 with respect to the phase-conjugate mirror 31 and 32.

Consequently, if $\theta$ has an initial value of $\theta_o$ at the beginning of an observation, and the longitudinal position of the object 24 changes by an amount "z" for z of the order of a few wavelengths, the phase $\theta$ at the second beam splitter 28 becomes:

$$\theta + \theta_o + 4 \pi z/(\lambda) \qquad \text{(Eq. 3)}$$

The extra factor of 2 in the z-dependent term is due to the reflection of the light from the object 24, i.e. the light traverses distance z twice.

The intensity of the light is now:

$$I = |U|^2 2[1 + cos(2\theta_o + 8\pi z/(\theta) + \theta_s)] \qquad \text{(Eq. 4)}$$

The end result is that random speckle intensity given by $|U|^2$ is modulated by a sinusoidal term which is a function of the objects's position z. One interference fringe is spread across the field just as it would be if the object 24 were a mirror. This property of the apparatus of the invention is independent of the precise details of the alignment.

It is noted that the phase of the cosine in Eq. 4 may be adjusted by changing $\theta_s$ by varying the longitudinal position of the self-pumped phase-conjugate mirror 31. The self-pumped phase-conjugate mirror 31 could also be dithered by mounting it on a piezoelectric driver 47 or other driver. The dither of the piezoelectric driver 47 could be operated to produce a spatial excursion of the phase conjugate mirror 31 equal to a small fraction of a wavelength, e.g. one half or one quarter wavelength, by using a sawtooth signal. More specifically, use of a piezoelectric drive 37 would allow a bias adjustment of the overall phase whereby, in essence, the cosine would be converted into a sine (see Eq. 4 above). In this way, the apparatus would be sensitive to very small displacements, even smaller that a wavelength. If you operate at the top of a fringe, the cosine function has zero slope and the apparatus zero sensitivity at the top of the fringe. However, if you operate on the ramp of a fringe, the apparatus responds linearly for small vibrations.

Use of the piezoelectric driver 47 permits discerning the direction the object 24 is moving; that is, whether the object is moving towards or away from the second beam splitter 28. More specifically, by placing a known test voltage or known dither on the driver 47, the operator would be able to notice the direction of signal changes from the detector 38 and would be able to know which direction the self-pumped phase-conjugate mirror 31 is moved with respect to the object 24 being monitored. Then by turning off the dither and noticing direction changes in the output signals from the detector 38, the operator would know the direction of movement of the object 24 or the surface thereof. By adjusting the bias of the piezoelectric driver 47, the apparatus could operate on the ramp of a sine wave, and the operator could immediately discern the effect of the dither on the output signal from the detector 38. The rate chosen for the dither would depend on all of the time constants in the elements of the apparatus. By using a dithered piezoelectric driver 47, the phase-conjugating apparatus 10 of the invention would not lose its phase lock because the internal interferences in phase conjugate mirror 31 which produce the phase-conjugation are insensitive to such motion.

For proper operation of the apparatus of the invention, the length of the reference optical path from the laser 12, to mirror 29, to third beam splitter 35, to either mirror 41 or mirror 48, and to externally-pumped phase-conjugate mirror 32 should be approximate equal to the length of the object optical path from the laser 12, to the first beam splitter 16, to the object 24, to the second beam splitter 28, and to the externally-pumped phase-conjugate mirror 32. This approximately equality of respective optical path lengths is required so that interference fringes form at the externally-pumped phase-conjugate mirror 32 and permit the first phase-conjugate beam 36 to form. More specifically, the interference fringes cause in essence a grating to form in the BSO crystal 32 by virtue of the fact that the fringes modulate the index of refraction of the BSO crystal 32. The pump beam is then diffracted off of the grating, and the phase-conjugate beam is formed in the externally-pumped phase-conjugate mirror 32 and goes to the second beam splitter 28.

Moreover, the distance between the second beam splitter 28 and the externally-pumped phase-conjugate mirror 32 is approximately equal to the distance between the second beam splitter 28 and the self-pumped phase-conjugate mirror 31. The second phase-conjugate beam 40 is phase conjugated from scattered radiation in the BaTiO$_3$ crystal which results in the formation of internal light loops which ultimately result in the formation of the second phase-conjugate beam 40 which emerges from the self-pumped phase-conjugate mirror 31.

As stated above, an optical detector 38 is used to detect the interference between the two phase-conjugate beams 36 and 40. The detector 38 can be a photomultiplier, a photodiode, a solid-state diode, or other suitable photo-electric transducer. The detector 38, in general, can be a fast light meter such as a square law detector, the kind of detector one would use to do heterodyning and other types of light detection. In operation, when the object 24 is stationary, the signal put out by the detector 38 is essentially a baseline or null signal. However, when the object 24 moves, the detector 38 puts out an oscillating signal.

The interferometric apparatus of the invention can be employed in a wide variety of practical applications. For example, the apparatus of the invention can be employed on an assembly line for the manufacture of rolled material. Two interferometers of the invention can be employed to measure two sides of the material to be rolled, and a difference signal can provide additional information about the surfaces and thickness variations of the material. Metals, foils, and plastic films, among others may all be measured by the apparatus of the invention as the respective material is being continuously produced. Generally speaking, the apparatus of the invention can also be employed in a wide variety of applications for measuring fast vibrations of small objects.

Although BSO is disclosed as being used in the externally-pumped phase-conjugate mirror, other phase-conjugating materials may be used. BSO is a photorefractive material and has a relatively long time constant. For applications that need faster time constants, extremely fast phase-conjugators employing gases can be employed.

Although photorefractive $BaTiO_3$ is disclosed as being used in the self-pumped phase-conjugate mirror, other photorefractive phase-conjugators can also be employed.

A number of unique benefits are obtained by employing the apparatus 10 of the invention which are not obtained by employing apparatus which employ only one phase-conjugating mirror. With the invention, the position of an object 24 or, alternatively, a surface, can be monitored with interferometric accuracy. One interference fringe covers the entire spatial field. The phase of the interference fringe depends on the longitudinal position of the object with respect to the externally-pumped phase-conjugate mirror 32 and the self-pumped phase-conjugate mirror 31.

With the apparatus 10, changes in the rotational orientation of the object 24 do not cause the apparatus 10 to adversely respond as long as the changes in rotational orientation do not change the DC component of its optical path to the externally-pumped phase-conjugate mirror 32 and the self-pumped phase-conjugate mirror 31. However, the changes in rotational orientation should not be so rapid as to exceed the response time of the phase-conjugating media.

Furthermore, with the interferometer of the invention having two phase-conjugate mirrors, a combining of contrasting properties of self-referenced phase-conjugators and externally-referenced phase-conjugators is obtained in the same interferometer.

With the invention, one is able to monitor a surface with interferometric precision without using film and the requisite steps for film development. In accordance with the invention, one can make surface measurements with interferometric precision without employing double exposures separated in time. With the invention, one can conduct measurements with interferometric precision that do not require the use of an interference pattern image. The invention also provides a technique for measuring or monitoring positions of surfaces with interferometric precision without variations in output intensity due to piezoelectric transducer motion.

It will be understood that various changes in the details, steps and arrangement of parts which have been herein described and illustrated to explain the nature of the invention, may be made by those skilled in the art within the principles and scope of the invention as expressed in the appended claims.

What is claimed is:

1. In an interferometer apparatus used for monitoring an object surface, said apparatus having a source of coherent light, means for dividing the coherent light into a reference beam and a second beam, means for reflecting the second beam from the object surface effective to make the second beam an object beam, means for dividing the object beam into two separate portions, and a light detector for detecting light interference, the apparatus comprising:
   an externally-pumped phase-conjugate mirror for receiving the reference beam, for receiving one portion of said object beam, and for reflecting the received portion of said object beam to the detector as a first phase-conjugate beam, and
   a self-pumped phase-conjugate mirror for receiving a second portion of said object beam and for reflecting the received portion of said object beam to the detector as a second phase-conjugate beam,
   wherein the first and second phase-conjugate beams interfere at the detector, effective to cause the interference produced thereby to be representative of changes in longitudinal distance between the object surface and said phase-conjugate mirrors.

2. An interferometer apparatus, comprising:
   a first beam splitter for dividing an input beam of coherent monochromatic light into an object probe beam and a reference beam and for passing an object beam resulting from reflection of the object probe beam off of the object,
   a first phase-conjugate mirror assembly spaced from said first beam splitter for receiving the reference beam from said first beam splitter, said first phase-conjugate mirror assembly including an externally-pumped phase-conjugate mirror,
   a second beam splitter spaced from said first beam splitter and from said first phase-conjugate mirror assembly,
   a second phase-conjugate mirror spaced from said second beam splitter, said second phase-conjugate mirror including a self-pumped phase-conjugate mirror, and
   a light detector spaced from said second beam splitter,
   wherein said second beam splitter is disposed to receive said object beam, reflect a portion of said object beam to said first phase-conjugate mirror assembly for reflection therefrom, receive said reflected object beam from said first phase-conjugate mirror assembly, and pass said reflected beam to said detector, and
   wherein said second beam splitter is disposed to pass a portion of said object beam to said second phase-conjugate mirror for reflection therefrom, and reflect said reflected beam from said second phase-conjugate mirror to said detector.

3. The apparatus described in claim 2 wherein said externally-pumped phase-conjugate mirror includes a photorefractive $Bi_{12}SiO_{20}$ (BSO) crystal.

4. The apparatus described in claim 3 wherein said externally-pumped phase-conjugate mirror includes a nonlinear crystal.

5. The apparatus described in claim 2 wherein said self-pumped phase-conjugate mirror includes a photorefractive $BaTiO_3$ crystal.

6. The apparatus described in claim 2 wherein second phase-conjugate mirror is driven by a piezoelectric transducer.

7. An interferometer apparatus which has a light detector, comprising:
   a source of coherent monochromatic radiation,
   a first phase-conjugate mirror spaced from said source, said first phase-conjugate mirror including an externally-pumped phase-conjugate mirror,
   a second phase-conjugate mirror spaced from said first phase-conjugate mirror, said second phase-conjugate mirror including a self-pumped phase-conjugate mirror,
   means for directing a portion of said source radiation to an object, for passing a portion of said source radiation to said first phase-conjugate mirror, and for passing radiation reflected off of the object,
   means for directing a first portion of the radiation reflected off of the object to said first phase-conjugate mirror and for passing light reflected off of said first phase-conjugate mirror to the detector, and for passing a second portion of said radiation reflected off of the object to said second phase-conjugate mirror and for passing light reflected off of said second phase-conjugate mirror to the detector.

8. A method for monitoring longitudinal position of an object surface irrespective of its optical roughness, comprising the steps of:
   directing a first portion of a coherent light beam onto an externally-pumped phase-conjugate mirror, the first portion serving as a reference beam,
   directing a second portion of the coherent light beam onto the object surface, such that an object beam reflects off of the object surface,
   directing a first portion of the object beam to the externally-pumped phase-conjugate mirror, such that the first portion of the object beam reflects off of the externally-pumped phase-conjugate mirror and passes to a detector,
   directing a second portion of the object beam to a self-pumped phase-conjugate mirror, such that the second portion of the object beam reflects off the self-pumped phase-conjugate mirror and is directed to the detector,
   permitting the first and second reflected portions of the object beam to interfere with one another at the detector, such that the detector produces an output signal representative of the interference, which is indicative of a change in longitudinal position between the object surface and the phase-conjugate mirrors.

* * * * *